(12) United States Patent
Wang et al.

(10) Patent No.: US 6,972,540 B1
(45) Date of Patent: Dec. 6, 2005

(54) DISK DRIVE EMPLOYING WEDGE SPINDLE SPEED CONTROL WITH ECCENTRICITY COMPENSATION

(75) Inventors: Zhi Wang, San Jose, CA (US); Jenghung Chen, Cupertino, CA (US); David Dung Tien Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/993,077

(22) Filed: Nov. 19, 2004

(51) Int. Cl.⁷ .............................. H02P 5/00; G11B 21/02
(52) U.S. Cl. ...................... 318/650; 318/560; 318/561; 318/254; 318/268; 360/75; 360/77.08; 360/78.12
(58) Field of Search ................................ 318/254, 439, 318/268, 560, 561, 603, 599; 360/73.03, 360/51, 75, 77.08, 78.12, 78.14

(56) References Cited

U.S. PATENT DOCUMENTS

| | | | |
|---|---|---|---|
| 5,905,705 A * | 5/1999 | Takeda et al. ................. 360/51 |
| 6,067,202 A | 5/2000 | Rowan et al. |
| 6,285,521 B1 * | 9/2001 | Hussein .................... 360/73.03 |
| 6,377,418 B1 * | 4/2002 | Kagami et al. .......... 360/78.14 |
| 6,496,324 B1 * | 12/2002 | Golowka et al. ........ 360/78.12 |
| 6,498,698 B1 * | 12/2002 | Golowka et al. ........ 360/78.12 |
| 6,567,230 B1 * | 5/2003 | Sri-Jayantha et al. .......... 360/75 |
| 6,577,088 B2 * | 6/2003 | Heydt et al. ................. 318/254 |
| 6,621,652 B2 * | 9/2003 | Haines et al. ............ 360/77.08 |
| 6,710,957 B2 | 3/2004 | Nakasato |
| 6,754,025 B1 | 6/2004 | Shepherd et al. |
| 6,825,622 B1 * | 11/2004 | Ryan et al. .................. 318/254 |
| 2002/0036859 A1 * | 3/2002 | Liu et al. ....................... 360/75 |
| 2002/0078413 A1 * | 6/2002 | Haines et al. ............... 714/748 |
| 2002/0084760 A1 * | 7/2002 | Messenger et al. ......... 318/439 |
| 2003/0048083 A1 * | 3/2003 | Tieu ........................... 318/254 |
| 2003/0085682 A1 * | 5/2003 | Hussein ...................... 318/599 |
| 2003/0102834 A1 * | 6/2003 | Hussein ...................... 318/439 |
| 2003/0184906 A1 | 10/2003 | Hanson et al. |
| 2004/0036436 A1 * | 2/2004 | Tieu ........................... 318/439 |
| 2004/0125485 A1 * | 7/2004 | Ehrlich ......................... 360/51 |
| 2004/0245950 A1 * | 12/2004 | Ang et al. ................... 318/268 |
| 2005/0063087 A1 * | 3/2005 | Ehrlich .................... 360/77.08 |
| 2005/0063088 A1 * | 3/2005 | Ehrlich .................... 360/77.08 |
| 2005/0105205 A1 * | 5/2005 | Suzuki ........................ 360/75 |

* cited by examiner

Primary Examiner—Paul Ip
(74) Attorney, Agent, or Firm—Howard H. Sheerin, Esq.

(57) ABSTRACT

A disk drive is disclosed wherein a BEMF speed error is measured during a BEMF spindle speed control mode, and a spindle control current is updated in response to the BEMF speed error to drive the disk at an operating speed. A reference time period (RTP) is calibrated, and a sinusoidal error in a wedge time period (WTP) due to eccentricity in the disk rotating is estimated to generate an eccentricity compensation value. After switching to a wedge spindle speed control mode, an actual WTP is detected and a wedge speed error is generated in response to the RTP, the detected actual WTP, and the eccentricity compensation value. The disk is then maintained at the operating speed by updating the spindle control current in response to the wedge speed error.

8 Claims, 7 Drawing Sheets

DISK DRIVE EMPLOYING WEDGE SPINDLE SPEED CONTROL WITH ECCENTRICITY COMPENSATION

BACKGROUND OF THE INVENTION

1. Field of the Invention

The present invention relates to disk drives. In particular, the present invention relates to a disk drive employing wedge spindle speed control with eccentricity compensation.

2. Description of the Prior Art

A disk drive typically comprises one or more disks rotated by a spindle motor while heads are actuated radially over the disk surfaces. Each disk surface comprises a number of radially spaced, concentric tracks, where each track is divided into a number of data sectors. A number of embedded servo sectors forming servo wedges are also written on each disk surface, which facilitate seeking the head and maintaining the head over the centerline of a target track during read and write operations. The disks are rotated at a constant angular velocity (CAV) while varying the data rate from an inner diameter zone to an outer diameter zone to maximize the recording density.

In order to achieve accurate reproduction, it is important to maintain the spindle motor "at speed" while writing data to and reading the data form the disks. To this end, prior art disk drives typically control the spindle speed by monitoring zero crossings in the BEMF voltage generated by the un-energized winding within the spindle motor. However, the bandwidth of a spindle speed control loop using BEMF voltage as feedback may be insufficient for a desired recording density or vibration tolerance.

U.S. Pat. No. 6,067,202 suggests to measure the time between servo sector pulses coincident with detecting each servo wedge, and to generate a speed error by comparing the measured time to a reference time corresponding to the desired spindle speed. Since the servo sector pulses occur more frequently than zero crossings in the BEMF voltage, the bandwidth of the spindle speed control loop increases, allowing for higher recording densities and/or improved vibration tolerance. However, the '202 patent discloses very little implementation details for a spindle speed control loop using servo sector pulses as feedback, and in particular, no implementation details on generating a reliable speed error measurement when there is eccentricity in the disk rotating. Eccentricities may occur, for example, if a media writer is used to servo write the disk before installing the disk into the disk drive, if the disk "slips" after using the head internal to the disk drive to servo write the disk, or if the disk slips after writing user data to the data sectors.

There is, therefore, a need for a disk drive employing a reliable spindle speed control loop using servo wedges as feedback for generating a speed error.

SUMMARY OF THE INVENTION

The present invention may be regarded as a disk drive comprising a disk having a plurality of tracks, wherein each track comprises a plurality of data sectors and a plurality of servo sectors forming N servo wedges, and a wedge time period (WTP) occurs between each servo wedge. A head is actuated over the disk, and a spindle motor rotates the disk at an operating speed in response to a spindle control current, the spindle motor comprising a plurality of windings, which generate a back electromotive force (BEMF) voltage. A BEMF detector generates a BEMF signal by comparing the BEMF voltage to a threshold. A BEMF speed error is measured in response to the BEMF signal during a BEMF spindle speed control mode, and the spindle control current is updated in response to the BEMF speed error to drive the disk at the operating speed. A reference time period (RTP) is calibrated, and a sinusoidal error in the WTP due to eccentricity in the disk rotating is estimated to generate an eccentricity compensation value. After switching to a wedge spindle speed control mode, an actual WTP is detected and a wedge speed error is generated in response to the RTP, the detected actual WTP, and the eccentricity compensation value. The disk is then maintained at the operating speed by updating the spindle control current in response to the wedge speed error.

In one embodiment, the sinusoidal error in the WTP is estimated by positioning the head over a selected one of the tracks, and calculating an estimated WTP according to:

$$\text{EST\_WTP} = \text{RTP} + \hat{a}^*\cos(2\pi k/N) + \hat{b}^*\sin(2\pi k/N)$$

wherein RTP is a reference time period corresponding to a nominal WTP, k is an index representing one of the servo wedges, and $\{\hat{a}, \hat{b}\}$ are adjustable coefficients. A wedge time error e(k) is estimated as the difference between the estimated WTP and the detected actual WTP, and the coefficients $\{\hat{a}, \hat{b}\}$ for generating the estimated WTP are adjusted according to $$\hat{a}(k+1) = \hat{a}(k) - G^* e(k)^* \cos(2\pi k/N)$$

$$\hat{b}(k+1) = \hat{b}(k) - G^* e(k)^* \sin(2\pi k/N)$$

wherein G is a predetermined gain. The above steps of calculating an estimated WTP, detecting an actual WTP, estimating a wedge time error e(k), and adjusting the coefficients $\{\hat{a}, \hat{b}\}$ are repeated at least once, for example, until the wedge time error e(k) falls below a predetermined threshold.

In another embodiment, each servo sector comprises a servo sync mark, a wedge period counter is controlled in response to the coefficients $\{\hat{a}, \hat{b}\}$, and a sync mark detection window is opened in response to the wedge period counter indicating the head is approaching a servo sync mark in a servo sector.

The present invention may also be regarded as a method of operating a disk drive, the disk drive comprising the disk having a plurality of tracks, wherein each track comprises a plurality of data sectors and a plurality of servo sectors forming N servo wedges, wherein a wedge time period (WTP) occurs between each servo wedge. The disk drive further comprises a head actuated over the disk, a spindle motor for rotating the disk at an operating speed in response to a spindle control current, the spindle motor comprising a plurality of windings which generate a back electromotive force (BEMF) voltage, and a BEMF detector for generating a BEMF signal by comparing the BEMF voltage to a threshold. A BEMF speed error is measured in response to the BEMF signal during a BEMF spindle speed control mode, and the spindle control current is updated in response to the BEMF speed error to drive the disk at the operating speed. A reference time period (RTP) is calibrated, and a sinusoidal error in the WTP due to eccentricity in the disk rotating is estimated to generate an eccentricity compensation value. After switching to a wedge spindle speed control mode, an actual WTP is detected and a wedge speed error is generated in response to the RTP, the detected actual WTP, and the eccentricity compensation value. The disk is then maintained at the operating speed by updating the spindle control current in response to the wedge speed error.

DESCRIPTION OF THE PREFERRED EMBODIMENTS

Figures 1A, 1B:
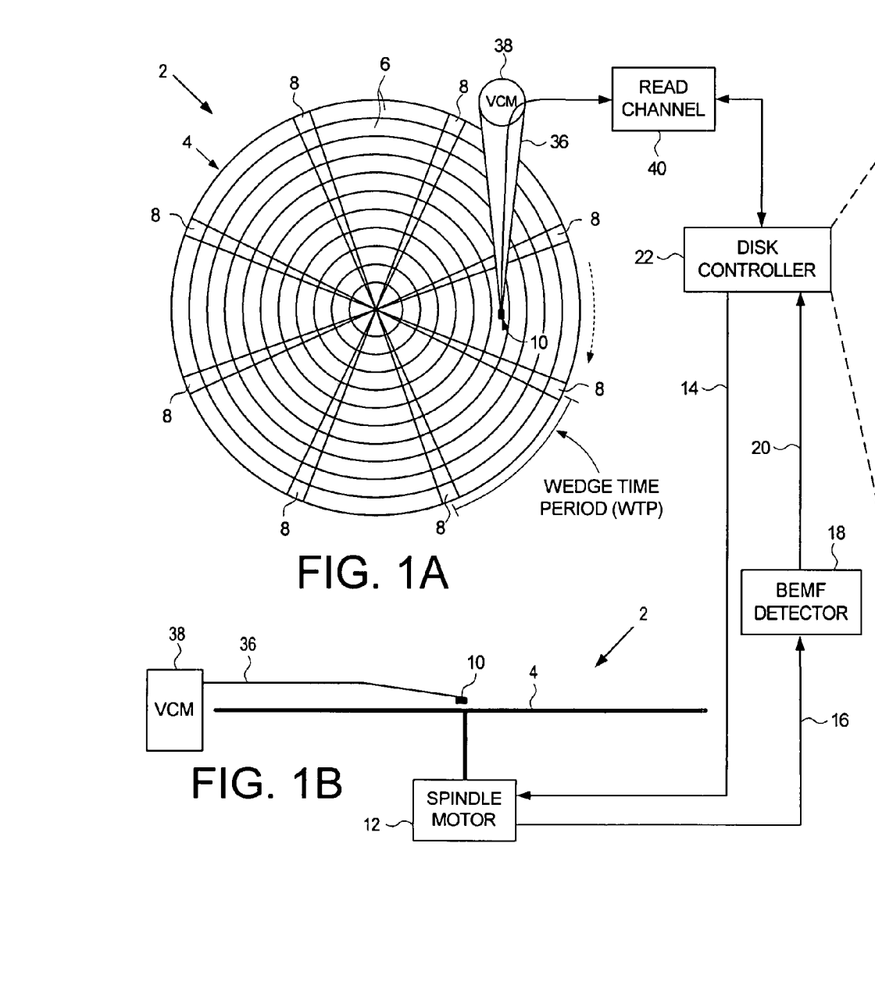
FIGS. 1A–1B show a disk drive according to an embodiment of the present invention comprising a disk having a plurality of servo wedges, a head actuated over the disk, and a disk controller for estimating a sinusoidal error in a wedge time period (WTP).
Figure 2:
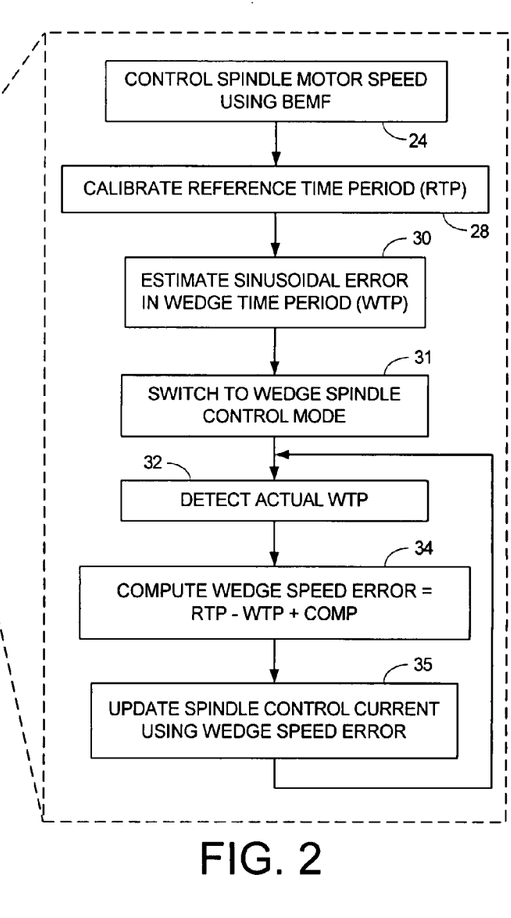
FIG. 2 is a flow diagram according to an embodiment of the present invention for using a compensated WTP for controlling the speed of a spindle motor.

FIGS. 1A–1B show a disk drive 2 according to an embodiment of the present invention comprising a disk 4 having a plurality of tracks 6, wherein each track comprises a plurality of data sectors and a plurality of servo sectors forming N servo wedges 8, and a wedge time period (WTP) occurs between each servo wedge 8. A head 10 is actuated over the disk 4, and a spindle motor 12 rotates the disk 4 at an operating speed in response to a spindle control current 14, the spindle motor 12 comprising a plurality of windings, which generate a back electromotive force (BEMF) voltage 16. A BEMF detector 18 generates a BEMF signal 20 by comparing the BEMF voltage 16 to a threshold. A disk controller 22 executes the flow diagram of FIG. 2 to estimate a sinusoidal error in the WTP due to eccentricity in the disk 4 rotating for use in compensating a wedge spindle speed control mode. At step 24, a BEMF speed error is generated in response to the BEMF signal 20 during the BEMF spindle speed control mode, and the spindle control current 14 is updated in response to the BEMF speed error to drive the disk 4 at the operating speed. At step 28 a reference time period (RTP) is calibrated, for example, by computing an average WTP over a revolution of the disk 4. At step 30 a sinusoidal error in the WTP due to eccentricity in the disk rotating is estimated to generate an eccentricity compensation value. At step 31, the disk controller 22 switches to the wedge spindle speed control mode. At step 32 an actual WTP is detected, and at step 34 a wedge speed error is generated representing a difference between the RTP and the detected actual WTP adjusted by the eccentricity compensation value. At step 35 the disk 4 is maintained at the operating speed by updating the spindle control current 14 in response to the wedge speed error.

In the embodiment of FIGS. 1A and 1B, the head 10 is connected to a distal end of an actuator arm 36, which is rotated about a pivot by a voice coil motor (VCM) 38 in order to actuate the head 10 radially over the disk 4. A read channel 40 processes the read signal emanating from the head 10 and detects an estimated binary sequence representing the data recorded on the disk 4. The read channel 40 also detects the sync marks in the servo wedges 8 used to update a wedge time counter 17 described below with reference to FIG. 8A. The read channel 40 may be implemented as a separate integrated circuit, or integrated with the disk controller 22 in a "system on a chip". Similarly, the BEMF detector 18 may be integrated into the disk controller 22 or implemented in a separate servo controller chip.

Figure 3:
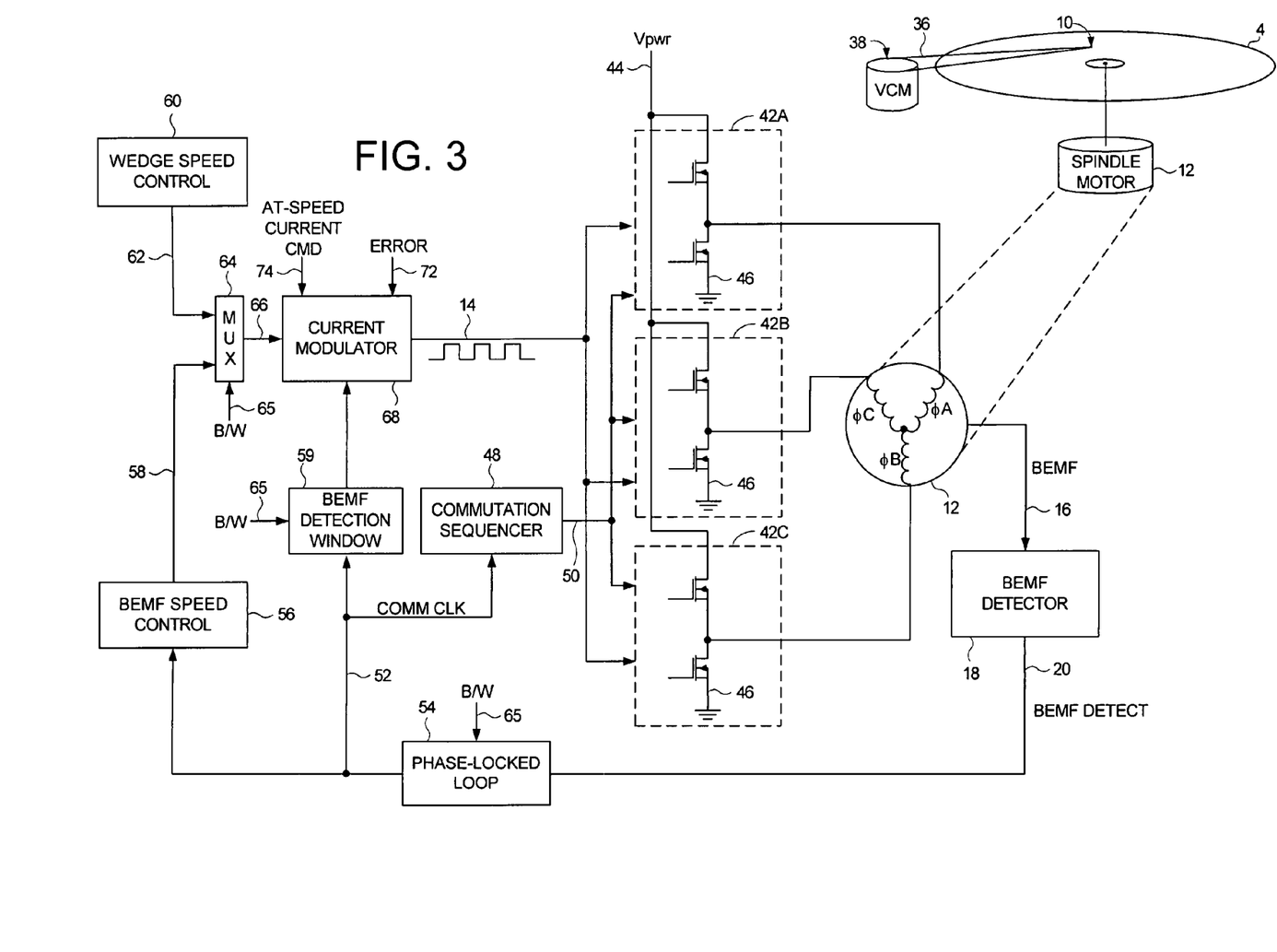
FIG. 3 shows further details of the spindle control circuitry according to an embodiment of the present invention including a BEMF detector, a phased-locked-loop, BEMF detection window circuitry, a commutation sequencer, and a current modulator for generating a PWM current control signal.

FIG. 3 shows a spindle motor 12 according to an embodiment of the present invention comprising three windings connected at a center tap forming three phases ($\phi A$, $\phi B$, $\phi C$); however, any suitable spindle motor comprising any suitable number of windings in any suitable configuration implementing any suitable number of phases may be employed. FIG. 3 also shows details of spindle driver circuitry comprising three sets of commutation switches 42A–42C each comprising a first field effect transistor (FET) for connecting a respective winding to a power supply Vpwr 44 and a second FET for connecting the respective winding to ground 46. A commutation sequencer 48 generates a control signal 50 applied to the commutation switches 42A–42C in order to drive current from the power supply 44 through the appropriate windings to ground 46 as determined from the commutation state. The commutation sequencer 48 may control the commutation switches 42A–42C in any suitable manner, such as in a conventional bipolar commutation sequence, tripolar commutation sequence, or hybrid bipolar-tripolar commutation sequence as disclosed in U.S. Pat. No. 5,808,440, the disclosure of which is incorporated herein by reference.

Figure 4:
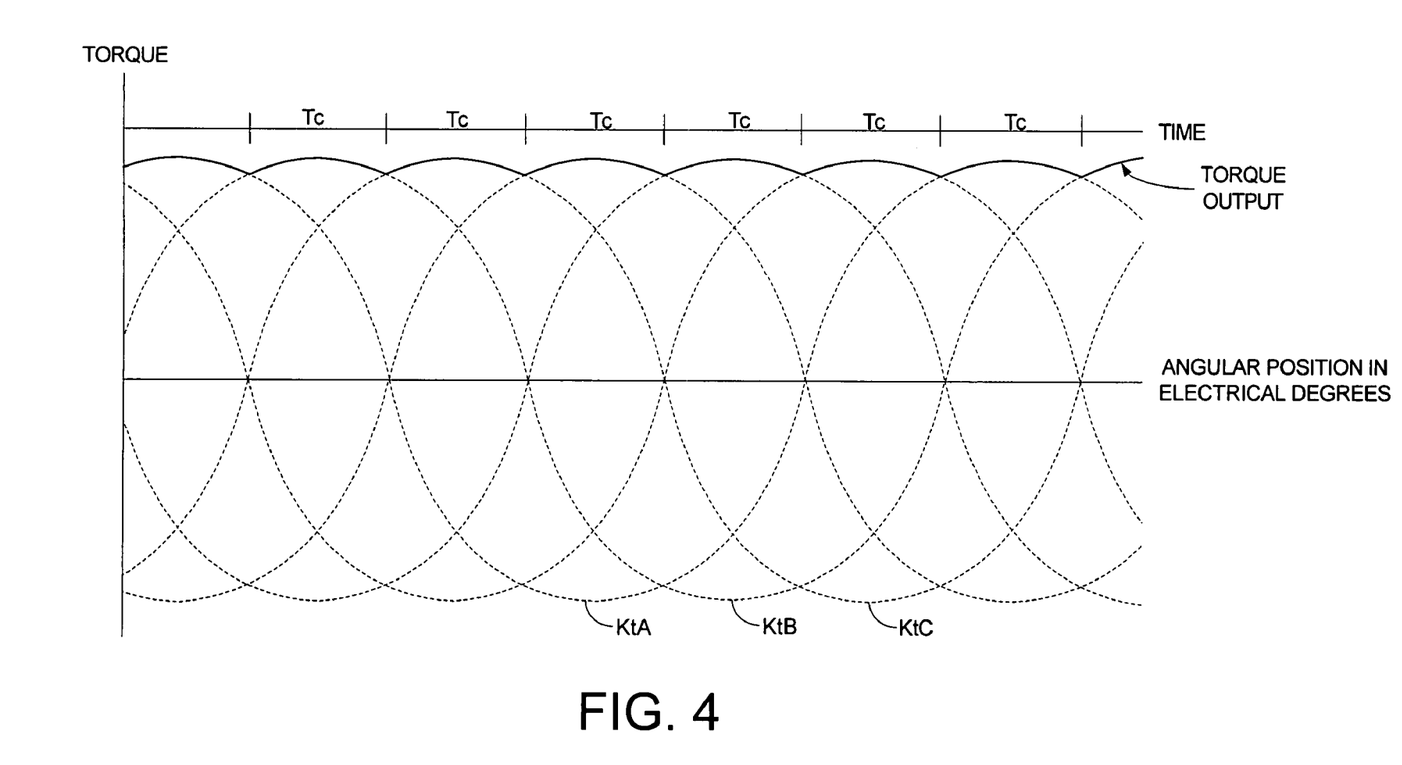
FIG. 4 is a waveform showing the torque curves generated by the windings of a three-phase spindle motor and an associated commutation interval.

The amount of torque generated by the spindle motor 12 is determined by the angular position of the rotor with respect to the stator, the magnitude of the current driving the windings, and a torque constant Kt. The torque constant Kt is a function of the number of turns in the windings as well as the strength of the permanent magnets. FIG. 4 illustrates the torque curves for the three-phase spindle motor 12 of FIG. 3, where the three dashed-line sine waves KtA, KtB, and KtC correspond to the torque profile for each phase of the spindle motor. The desired torque output (shown as a solid line) is generated by changing the commutation state at the appropriate commutation interval Tc.

The appropriate commutation interval can be determined by detecting zero crossings in the BEMF voltage 16 generated by the un-energized winding. In FIG. 3, a commutation clock 52 is generated by a phase-locked-loop (PLL) 54, which locks onto the frequency of the BEMF zero crossings signal 20. The commutation clock 52 is applied to the commutation sequencer 48 and a BEMF speed control block 56. The BEMF speed control block 56 computes the BEMF speed error as the difference between an actual and desired frequency of the BEMF zero crossings signal 20, and implements a compensator for generating a BEMF spindle control current command 58 in response to the BEMF speed error. A current modulator 68 adjusts a duty cycle of a PWM signal 14 (spindle control current 14 in FIG. 1A) in response to the BEMF spindle control current command 58, which controls the amount of current flowing through the energized windings, and therefore the amount of torque output and speed of the spindle motor 12. BEMF detection window circuitry 59 periodically disables the PWM signal 14 (e.g., holds the PWM signal 14 high) for a predetermined interval (detection window) to attenuate noise in the BEMF voltage 16 while the BEMF detector 18 compares the BEMF voltage 16 to the threshold. In the embodiment of FIG. 3, the timing of the BEMF detection window is determined from the commutation clock 52.

A wedge speed control block 60 generates the wedge speed error in response to the servo wedges 8, the reference time period (RTP), and the eccentricity compensation values. The wedge speed control block 60 implements a compensator for generating a wedge spindle control current command 62 in response to the wedge speed error. In one embodiment, the compensator implemented in the wedge speed control block 60 has a higher bandwidth than the compensator implemented by the BEMF speed control block 56.

A multiplexer 64 controlled by signal B/W 65 selects between the BEMF spindle control current command 58 and the wedge spindle control current command 62 as the control current command 66 applied to the current modulator 68. In one embodiment, during an error condition 72 the current modulator 68 fixes the duty cycle of the PWM signal 14 in response to an at-speed current command 74 so that the at-speed current is applied to the windings.

In one embodiment, the B/W signal 65 also disables the BEMF detection window circuitry 59 while the speed of the spindle motor 12 is controlled in response to the wedge speed error. This embodiment helps reduce acoustic noise caused by current transients that occur when the PWM signal 14 is disabled (e.g., held high) during the detection window. In one embodiment while the BEMF detection window circuitry 59 disabled, the B/W signal 65 configures the PLL 54 to output a fixed frequency commutation clock 52 corresponding to the at-speed frequency. In an alternative embodiment, the PLL 54 continues to generate the commutation clock 52 in response to the BEMF signal 20 even though it may be less reliable due to the noise induced into the BEMF voltage 16 by the switching action of the PWM signal 14.

In one embodiment, a wedge time counter is incremented at a predetermined frequency, and predetermined number of wedge time counter values are accumulated representing a predetermined number of WTPs. This embodiment is illustrated in the flow diagram of FIGS. 5 and 6. At step 76 the BEMF detector 18 is enabled and the disk 4 is spun up to the operating speed by updating the spindle control current 14 in response to the BEMF speed error 58. Once the disk 4 is rotating at the operating speed (substantially zero BEMF speed error 58), a reference time period (RTP) is calibrated at step 78. In this embodiment, the RTP is generated by accumulating a predetermined number of wedge time counter values. That is, as each servo wedge 8 is detected, the wedge time counter value (adjusted by a corresponding eccentricity compensation value) is summed into the RTP (unless a servo wedge error is encountered as described below, in which case the wedge time counter value is ignored). In one embodiment, the wedge time counter is reset at each servo wedge 8, and in another embodiment, the wedge time counter is free running and the WTP is determined from the incremented wedge time counter value from wedge to wedge. At step 79 coefficients {â,ḃ} for generating estimated WTPs are computed by executing the flow diagram described below with reference to FIG. 7, and in one embodiment, over a number of different radial locations of the disk 4.

Figure 5:
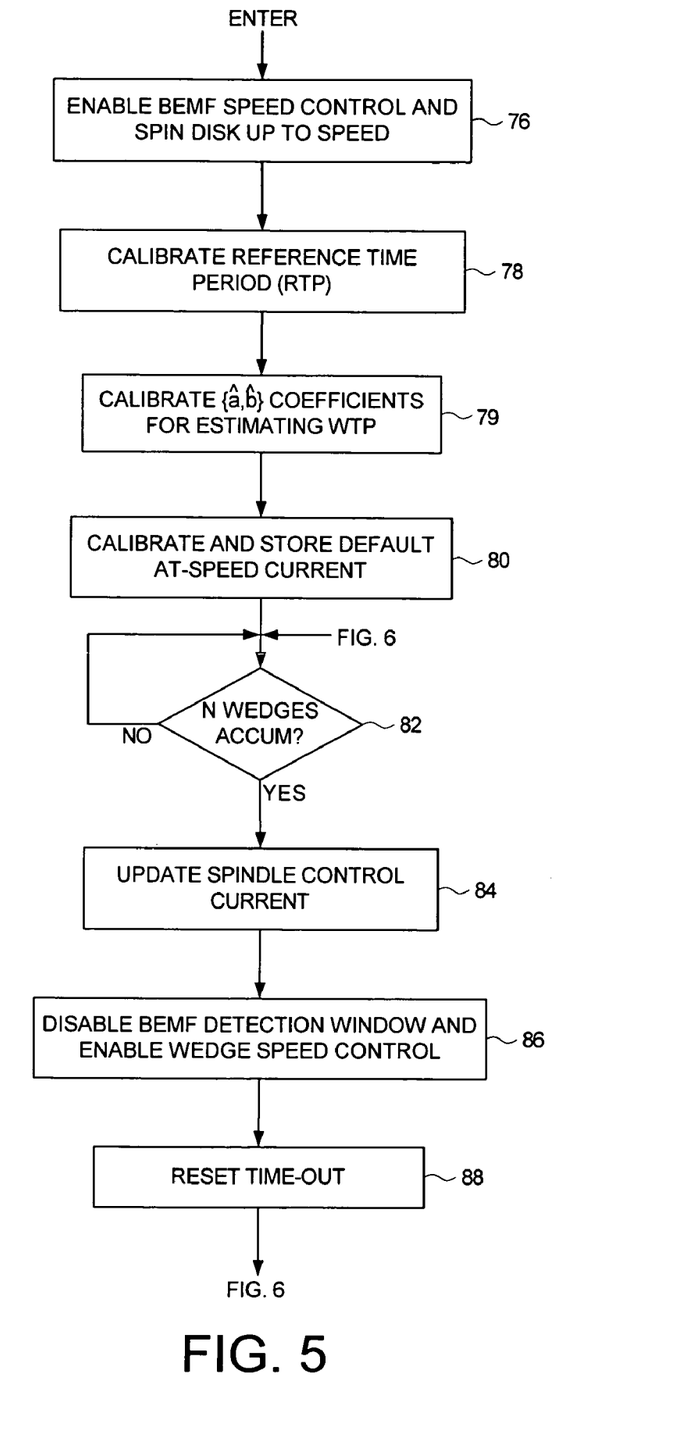
FIG. 5 is a flow diagram according to an embodiment of the present invention for spinning the disk up to the operating speed, calibrating a default at-speed current, and switching from the BEMF spindle speed control mode to wedge spindle speed control mode.

At step 80 a default at-speed current is calibrated, which is the spindle control current 14 that generates a substantially zero BEMF speed error. The default at-speed current is used as the spindle control current 14 if an error condition is detected immediately after transitioning into the wedge speed control mode. Otherwise, the at-speed current is updated while the wedge speed error is substantially zero when controlling the spindle motor 12 in the wedge speed control mode.

While in the BEMF spindle speed control mode, the wedge time counter values (adjusted by corresponding eccentricity compensation values) are accumulated until at step 82 N wedge-to-wedge times have been accumulated into a wedge time period. If so, at step 84 the spindle control current 14 is updated in response to the wedge speed error computed by subtracting the wedge time period from the reference time period. At step 86 the BEMF detection window circuitry 59 is disabled, the wedge spindle speed control mode is enabled, and at step 88 a time-out counter for timing a time-out interval is reset. Any suitable time-out interval may be employed. In one embodiment, N wedge time counter values are accumulated to generate the wedge speed error, and the time-out interval is configured to M*N servo wedges 8 (where M is greater than 1 e.g., 1.5). That is, an error condition is detected if N wedge time counter values have not been accumulated within M*N servo wedges 8.

Figure 6:
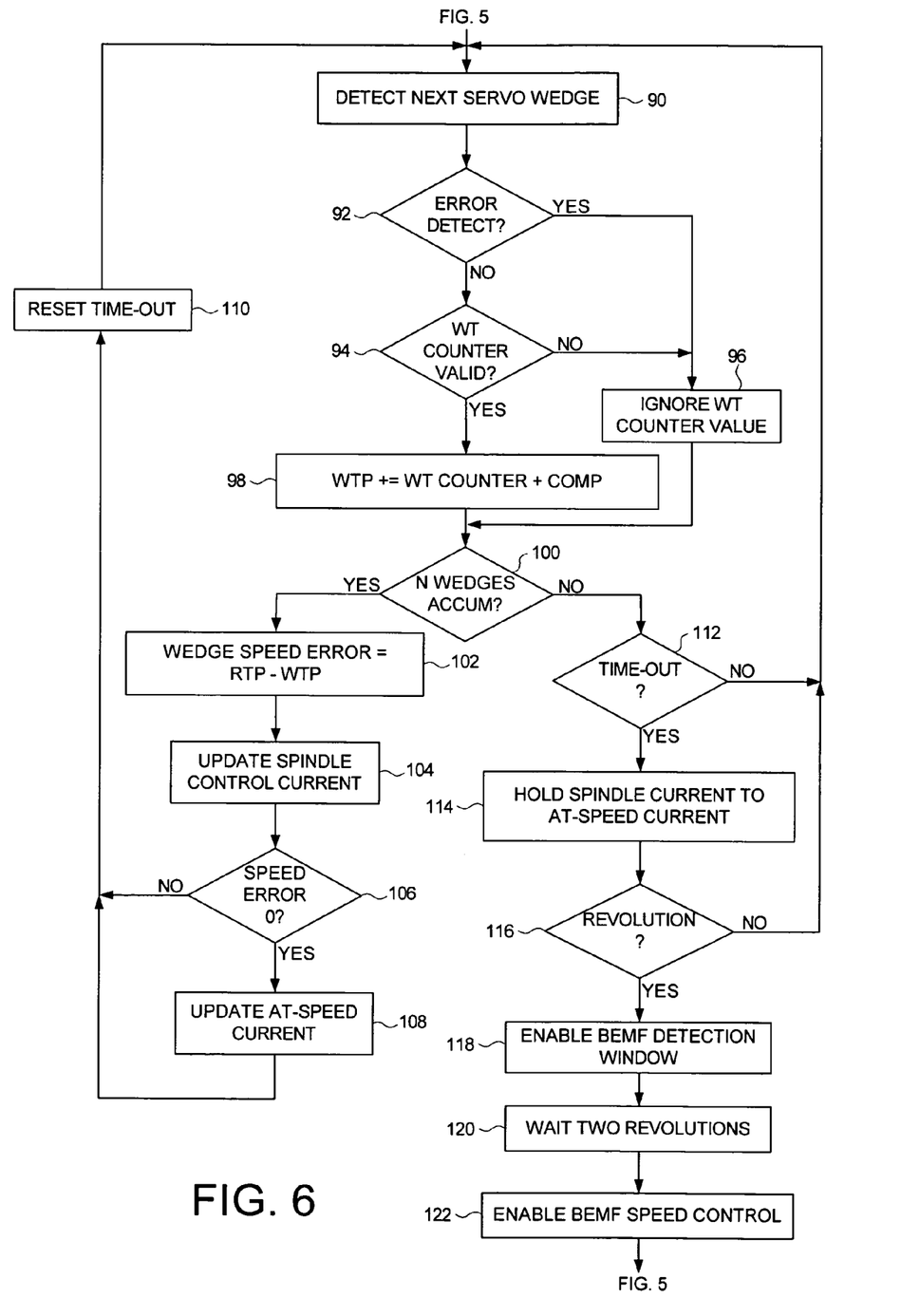
FIG. 6 is a flow diagram according to an embodiment of the present invention wherein a spindle control current is updated in response to a wedge speed error generated by accumulating a predetermined number of wedge time periods to generate a wedge time period and comparing the wedge time period to a reference time period.

Control then continues at step 90 of FIG. 6 wherein the next servo wedge 8 is detected. If a servo wedge error occurs, which may include an inability to synchronize to a servo wedge due to a burst error or detection of a bad track ID at step 92, or a bad wedge time counter value at step 94, then at step 96 the wedge time counter value is ignored. A bad wedge time counter value may be detected at step 94, for example, if a servo wedge is missed altogether. If a servo wedge error is not detected, then at step 98 the wedge counter value adjusted by an eccentricity compensation value is summed into the estimated WTP. The eccentricity compensation value is computed from coefficients {â,ḃ} for estimating the sinusoidal error in the WTP (FIG. 7), and in one embodiment the eccentricity compensation values are computed as a function of the current wedge number and track number. If at step 100 N wedge time counter values have been accumulated, then at step 102 the wedge speed error is computed by subtracting the WTP from the RTP. At step 104 the spindle control current 14 is updated in response to the wedge speed error. If at step 106 the wedge speed error is zero (or substantially zero), then at step 108 the at-speed current is updated with the spindle control current 14. Some form of averaging may be employed to filter noisy or erroneous spindle control current values. At step 110 the timer for timing the time-out interval is reset, and the process continues at step 90.

If at step 100 N wedge time counter values have not been accumulated and at step 112 the time-out interval expires, then an error condition is detected and at step 114 the spindle control current 14 is set to the at-speed current. Setting the spindle control current 14 to the at-speed current helps maintain the disk at the operating speed until the error condition subsides. If at step 116 a revolution of the disk 4 has not occurred without updating the spindle control current 14, then control branches back to step 90 to detect the next servo wedge. Because the time-out interval has not been reset, control will branch to step 112 and step 114 until N wedge time counter values have been accumulated at step 100. However, if at step 116 an entire revolution of the disk 4 has occurred before N wedge time counter values are accumulated, then the disk controller 22 transitions back into the BEMF spindle speed control mode. At step 118 the BEMF detection window circuitry 59 is enabled, and after waiting two revolutions of the disk 4 at step 120 to allow the BEMF speed error 58 to settle, the BEMF spindle speed control mode is enabled at step 122 and control branches to step 82 of FIG. 5. The disk controller 22 remains in the BEMF spindle speed control mode until again N wedge time counter values are accumulated at step 82 and the spindle control current 14 is updated at step 84.

In one embodiment, the disk controller 22 switches from the wedge spindle speed control mode to the BEMF spindle speed control mode without having detected an error. For example, during a calibration procedure the disk controller 22 may seek the head 10 to a calibration track where the timing between servo wedges 8 changes such that the reference time period is no longer valid. In addition, the disk controller 22 may switch from wedge spindle speed control to BEMF spindle speed control to perform certain test during manufacturing, such as resonance discover of the spindle motor 12. After disabling the wedge spindle speed control mode the disk controller 22 sets the spindle control current 14 to the at-speed current 74 for a predetermined interval (e.g., two revolutions of the disk) to allow the BEMF speed error 58 to settle. Once the BEMF speed error 58 settles, the disk controller 22 can transition safely into the BEMF spindle speed control mode.

Figure 7:
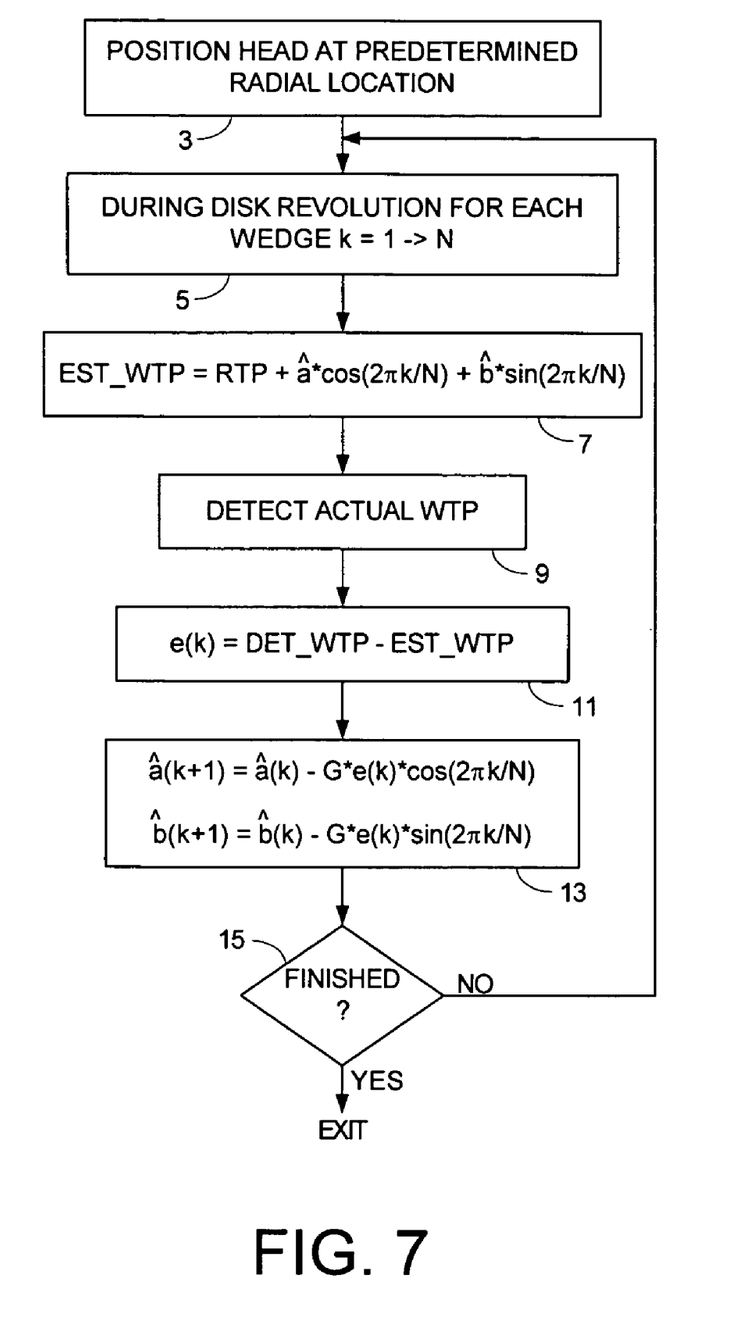
FIG. 7 is a flow diagram according to an embodiment of the present invention for estimating the sinusoidal error in the WTP by estimating coefficients of the sinusoid using closed-loop feedback.

The sinusoidal error in the WTP may be estimated using any suitable technique, such as the prior art technique of using a single-point Discrete Fourier Transform (DFT). In another embodiment, the sinusoidal error in the WTP is computed using closed-loop feedback by the disk controller 22 executing the flow diagram shown in FIG. 7. At step 3 the head 10 is positioned over a selected one of the tracks 6, and during each revolution of the disk 4 (step 5) an estimated WTP is calculated at step 7 according to:

$$\mathrm{EST\_WTP} = \mathrm{RTP} + \hat{a}^* \cos(2\pi k/N) + \hat{b}^* \sin(2\pi k/N)$$

wherein RTP is a reference time period corresponding to a nominal WTP, k is an index representing one of the servo wedges, and $\{\hat{a}, \hat{b}\}$ are adjustable coefficients. At step 9 an actual WTP is detected by detecting an interval between the head 10 passing over a first and second servo wedge 8. At step 11 a wedge time error e(k) is estimated as the difference between the estimated WTP and the detected actual WTP. At step 13 the coefficients $\{\hat{a}, \hat{b}\}$ for generating the estimated WTP are adjusted according to:

$$\hat{a}(k+1) = \hat{a}(k) - G^* e(k)^* \cos(2\pi k/N)$$

$$\hat{b}(k+1) = \hat{b}(k) - G^* e(k)^* \sin(2\pi k/N)$$

wherein G is a predetermined gain. At step 15 the above steps of calculating an estimated WTP, detecting an actual WTP, estimating a wedge time error e(k), and adjusting the coefficients $\{\hat{a}, \hat{b}\}$ are repeated at least once, for example, until the wedge time error e(k) falls below a predetermined threshold. Because the embodiment of FIG. 7 uses closed-loop feedback, the above equation will converge to an accurate estimate of the coefficients $\{\hat{a}, \hat{b}\}$ within fewer revolutions of the disk as compared to the prior art technique of computing a single-point DFT. In one embodiment, the number of iterations to compute the coefficients using the above equation is determined based on a fixed number of disk revolutions. In an alternative embodiment, the iterations are terminated once the wedge time error e(k) falls below a predetermined threshold thereby minimizing the number of disk revolutions.

In one embodiment, the flow diagram of FIG. 7 is executed over a number of different radial locations (different tracks 6) to account for the change in the sinusoidal error relative to the radial location of the head 10. For example, in one embodiment the disk drive is partitioned into a number of zones wherein each zone comprises a predetermined band of tracks. The flow diagram is executed for a selected track in each zone (e.g., the middle track) and the resulting coefficients $\{\hat{a}, \hat{b}\}$ used for each track in the zone. A suitable interpolation technique may also be employed to calculate the coefficients $\{\hat{a}, \hat{b}\}$ based on the radial location (track number), for example, using a suitable curve fitting polynomial.

Figure 8A:
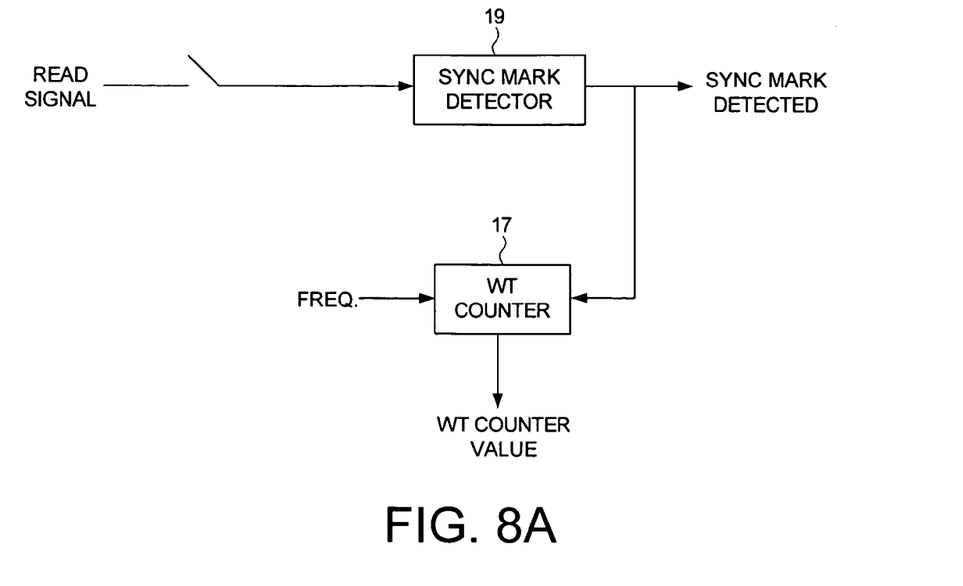
FIG. 8A shows an embodiment of the present invention wherein a wedge time counter is used to detect an actual WTP.

Any suitable circuitry may be employed to detect the actual WTP during the wedge spindle speed control mode. FIG. 8A shows an embodiment of the present invention wherein a wedge time counter 17 is clocked at a predetermined frequency. When a sync mark detector 19 detects a sync mark in the servo wedge 8, the value of the wedge time counter 17 is latched as a servo time stamp. The actual WTP detected is then computed as the difference between consecutive servo time stamps (wedge time counter values).

Figure 8B:
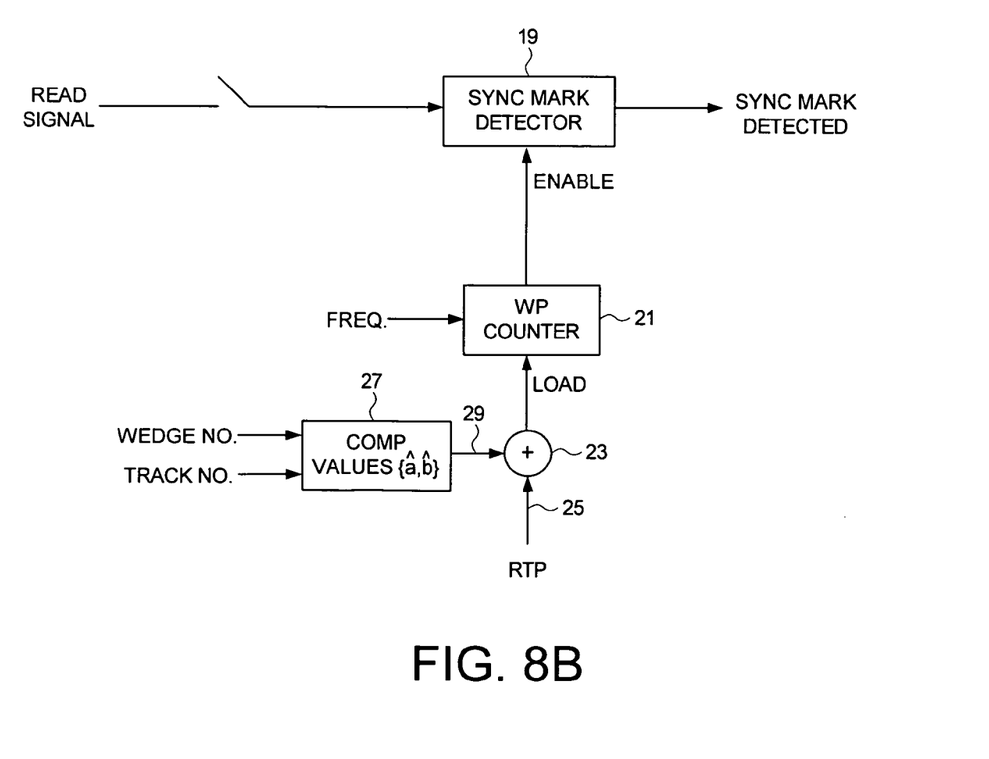
FIG. 8B shows an embodiment of the present invention wherein a wedge period counter is loaded with a nominal value adjusted by an eccentricity compensation value computed using the coefficients of the sinusoidal error in the WTP.

In addition to generating eccentricity compensation values for wedge spindle speed control, the coefficients $\{\hat{a}, \hat{b}\}$ may be used to enhance other aspects of the disk drive 2. In an embodiment shown in FIG. 8B, the coefficients $\{\hat{a}, \hat{b}\}$ are used to enable the sync mark detector 19 at the appropriate time by opening a sync mark detection window commensurate with the head 10 approaching a servo sync mark. A wedge period counter 21 is loaded with a count value corresponding to the estimated WTP for the current servo wedge. The count value is computed by adding 23 the RTP 25 to an eccentricity compensation value 29 computed 27 using the coefficients $\{\hat{a}, \hat{b}\}$ as a function of the wedge number and track number. The eccentricity compensation values 29 may be computed 27 using any suitable technique such as a lookup table or curve fitting polynomial. After loading the wedge period counter 21 with the estimated WTP value, the wedge period counter 21 is decremented at a predetermined frequency and then opens the sync mark detection window when the wedge period counter 21 underflows.

We claim:

1. A disk drive comprising:
   - (a) a disk comprising a plurality of tracks, wherein:
     each track comprises a plurality of data sectors and a plurality of servo sectors forming N servo wedges; and
     a wedge time period (WTP) occurs between each servo wedge;
   - (b) a head actuated over the disk;
   - (c) a spindle motor for rotating the disk at an operating speed in response to a spindle control current, the spindle motor comprising a plurality of windings which generate a back electromotive force (BEMF) voltage;
   - (d) a BEMF detector for generating a BEMF signal by comparing the BEMF voltage to a threshold; and (e) a disk controller for:
  measuring a BEMF speed error responsive to the BEMF signal during a BEMF spindle speed control mode;
  updating the spindle control current in response to the BEMF speed error to drive the disk at the operating speed;
  calibrating a reference time period (RTP);
  estimating a sinusoidal error in the WTP due to eccentricity in the disk rotating to generate an eccentricity compensation value;
  switching to a wedge spindle speed control mode;
  detecting an actual WTP by detecting an interval between the head passing over a first and second servo wedge;
  generating a wedge speed error in response to the RTP, the detected actual WTP, and the eccentricity compensation value; and
  maintaining the disk at the operating speed by updating the spindle control current in response to the wedge speed error.

2. The disk drive as recited in claim 1, wherein the disk controller estimates the sinusoidal error in the WTP by:
  (a) positioning the head over a selected one of the tracks;
  (b) calculating an estimated WTP according to:

$$\text{EST\_WTP} = \text{RTP} + \hat{a}*\cos(2\pi k/N) + \hat{b}*\sin(2\pi k/N)$$

wherein RTP is a reference time period corresponding to a nominal WTP, k is an index representing one of the servo wedges, and $\{\hat{a}, \hat{b}\}$ are adjustable coefficients;
  (c) estimating a wedge time error e(k) as the difference between the estimated WTP and the detected actual WTP;
  (d) adjusting the coefficients $\{\hat{a}, \hat{b}\}$ for generating the estimated WTP according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain; and
  (e) repeating steps (b)–(e) at least once.

3. The disk drive as recited in claim 2, wherein the disk controller repeats steps (b)–(e) until the wedge time error e(k) falls below a predetermined threshold.

4. The disk drive as recited in claim 2, wherein:
  (a) each servo sector comprises a servo sync mark;
  (b) the disk controller controls a wedge period counter in response to the coefficients $\{\hat{a}, \hat{b}\}$; and
  (c) the disk controller opens a sync mark detection window in response to the wedge period counter indicating the head is approaching a servo sync mark in a servo sector.

5. A method of operating a disk drive, the disk drive comprising the disk having a plurality of tracks, wherein each track comprises a plurality of data sectors and a plurality of servo sectors forming N servo wedges, wherein a wedge time period (WTP) occurs between each servo wedge, the disk drive further comprising a head actuated over the disk, a spindle motor for rotating the disk at an operating speed in response to a spindle control current, the spindle motor comprising a plurality of windings which generate a back electromotive force (BEMF) voltage, and a BEMF detector for generating a BEMF signal by comparing the BEMF voltage to a threshold, the method comprising the steps of:
  (a) measuring a BEMF speed error responsive to the BEMF signal during a BEMF spindle speed control mode;
  (b) updating the spindle control current in response to the BEMF speed error to drive the disk at the operating speed;
  (c) calibrating a reference time period (RTP);
  (d) estimating a sinusoidal error in the WTP due to eccentricity in the disk rotating to generate an eccentricity compensation value;
  (e) switching to a wedge spindle speed control mode;
  (f) detecting an actual WTP by detecting an interval between the head passing over a first and second servo wedge;
  (g) generating a wedge speed error in response to the RTP, the detected actual WTP, and the eccentricity compensation value; and
  (h) maintaining the disk at the operating speed by updating the spindle control current in response to the wedge speed error.

6. The method as recited in claim 5, wherein the step of estimating the sinusoidal error in the WTP comprises the steps of:
  (a) positioning the head over a selected one of the tracks;
  (b) calculating an estimated WTP according to:

$$\text{EST\_WTP} = \text{RTP} + \hat{a}*\cos(2\pi k/N) + \hat{b}*\sin(2\pi k/N)$$

wherein RTP is a reference time period corresponding to a nominal WTP, k is an index representing one of the servo wedges, and $\{\hat{a}, \hat{b}\}$ are adjustable coefficients;
  (c) estimating a wedge time error e(k) as the difference between the estimated WTP and the detected actual WTP;
  (d) adjusting the coefficients $\{\hat{a}, \hat{b}\}$ for generating the estimated WTP according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain; and
  (e) repeating steps (b)–(e) at least once.

7. The method as recited in claim 6, wherein steps (b)–(e) are repeated until the wedge time error e(k) falls below a predetermined threshold.

8. The method as recited in claim 6, wherein each servo sector comprises a servo sync mark, further comprising the steps of:
  (a) controlling a wedge period counter in response to the coefficients $\{\hat{a}, \hat{b}\}$; and
  (b) opening a sync mark detection window in response to the wedge period counter indicating the head is approaching a servo sync mark in a servo sector.

* * * * *